(12) United States Patent
Wilkerson

(10) Patent No.: US 8,721,139 B2
(45) Date of Patent: May 13, 2014

(54) LIGHTED BRACKET FOR MUD FLAP WEIGHT

(76) Inventor: Bryan D. Wilkerson, White Plains, KY (US)

(*) Notice: Subject to any disclaimer, the term of this patent is extended or adjusted under 35 U.S.C. 154(b) by 85 days.

(21) Appl. No.: 13/136,821

(22) Filed: Oct. 28, 2011

(65) Prior Publication Data

US 2012/0051080 A1 Mar. 1, 2012

Related U.S. Application Data

(60) Provisional application No. 61/402,053, filed on Aug. 24, 2010.

(51) Int. Cl.
*B60Q 1/26* (2006.01)
*B60Q 1/00* (2006.01)

(52) U.S. Cl.
USPC ........... 362/485; 362/506; 362/505; 280/847; 280/152.05

(58) Field of Classification Search
USPC .................. 362/506, 542, 549, 540, 485, 505
See application file for complete search history.

(56) References Cited

U.S. PATENT DOCUMENTS

| | | | | |
|---|---|---|---|---|
| 3,782,757 A * | 1/1974 | Juergens | ........................ | 280/851 |
| 3,954,281 A * | 5/1976 | Juergens | ........................ | 280/851 |
| 4,960,294 A * | 10/1990 | Leonard | ........................ | 280/848 |
| 5,025,351 A * | 6/1991 | Martin | ........................ | 362/506 |
| 5,032,955 A * | 7/1991 | Jurgens | ........................ | 362/517 |
| 5,434,013 A * | 7/1995 | Fernandez | .................... | 428/690 |
| 6,076,842 A * | 6/2000 | Knoer | ........................ | 280/154 |
| 6,116,628 A * | 9/2000 | Adrian | ........................ | 280/154 |
| 6,164,804 A * | 12/2000 | Self | ........................ | 362/485 |
| 6,938,930 B1 * | 9/2005 | Beach | ........................ | 280/851 |
| 7,128,449 B2 * | 10/2006 | Golle et al. | ................... | 362/485 |
| 7,665,870 B2 * | 2/2010 | Golle et al. | ................... | 362/485 |
| 7,909,343 B2 * | 3/2011 | Archer et al. | ................ | 280/154 |
| 2006/0092652 A1 * | 5/2006 | Lau | ........................ | 362/503 |
| 2008/0310179 A1 * | 12/2008 | Bates | ........................ | 362/506 |
| 2009/0212516 A1 * | 8/2009 | Richard | .................... | 280/47.26 |
| 2009/0241388 A1 * | 10/2009 | Dunn | ........................ | 40/463 |
| 2010/0019689 A1 * | 1/2010 | Shan | ........................ | 315/294 |
| 2011/0116231 A1 * | 5/2011 | Dunn et al. | ................... | 361/695 |

* cited by examiner

*Primary Examiner* — Sikha Roy
(74) *Attorney, Agent, or Firm* — Joseph T. Leone, Esq.; DeWitt Ross & Stevens S.C.

(57) ABSTRACT

A lighted bracket for a mud flap weight. The bracket includes a housing having at least one first aperture passing through it. The aperture is dimensioned and configured to attach the housing to a mud flap weight, and a light attached to the housing in a position such that illumination from the light passes through any openings in the mud flap weight.

2 Claims, 1 Drawing Sheet

LIGHTED BRACKET FOR MUD FLAP WEIGHT

CROSS-REFERENCE TO RELATED APPLICATIONS

Priority is hereby claimed to provisional application Ser. No. 61/402,053, filed Aug. 24, 2010, the content of which is incorporated herein by reference.

FIELD OF THE INVENTION

Disclosed and claimed herein is a lighted bracket dimensioned and configured to reversibly engage a mud flap weight bracket so as to create a shadow box-like effect on a cut-out design on the mud flap weight

BACKGROUND

Mud flaps are commonly used in conjunction with the rear wheels of pickup trucks, semi-tractor trailers, automobiles, motorcycles and the like to prevent mud, rocks, and other road debris from being launched by the action of the wheels onto the vehicle to which the mud flaps are attached or into the path other vehicles. Mud flaps are typically made of tough, semi-flexible sheets of hardened rubber or similar polymeric materials. Mud flaps also often include a weight affixed at or near the bottom edge of the mud flap in order to keep the flap in place and to give it additional heft so as to deflect downward the heavier debris from the road.

Because mud flaps and their associated mud flap weights are readily seen by other motorists, it is common for mud flaps and mud flap weights to be decorated. Professional truck drivers, especially those who own and operate their own trucking rigs, are known to devote considerable time, effort, and money into customizing the appearance their vehicles. This often includes custom paint jobs and pin-striping, custom wheels, as well as custom-made mud flaps and mud flap weights. Often mud flap weights are customized to include a cut-out silhouette of the a desired shape, such as the name of the truck builder (for example, Peterbilt or Mack) or other words and/or shapes.

SUMMARY OF THE INVENTION

Disclosed is a lighted bracket for a mud flap weight. The bracket comprises a housing having at least one first aperture passing through it. The aperture is dimensioned and configured to reversibly attach the housing to a mud flap weight. A light is attached to the housing at a point where illumination from the light shines through any openings in a mud flap weight when the housing is attached to the mud flap weight via the first aperture.

The light is preferably a light-emitting diode (LED), an organic light-emitting diode (OLED), an incandescent light, a fluorescent light, or any combination of these light sources. The lighted bracket may optionally comprise an electrical lead attached to the light and configured to operationally connect the light to an electrical system of a vehicle. To present a neat appearance, it is preferred that the housing further includes a second aperture through which the electrical lead passes. That way, the lighted bracket can be electrically wired to the vehicle with essentially no electrical wiring being visible once the bracket is fully installed.

It is generally preferred, although not required, that the bracket comprises three first apertures passing through it, wherein each first aperture is dimensioned and configured to attach the housing to a mud flap weight. In this fashion, the lighted bracket can be securely (but reversibly) attached to the mud flap weight of a vehicle.

In a particularly preferred version of the lighted bracket, the housing comprises a first member corresponding in shape to a perimeter of a mud flap weight. The at least one first aperture for mounting the bracket to a mud flap weight passes through the first member. The housing also includes a second member attached to the first member, and the light is attached to the second member. If an electrical lead is present, the first member of the housing further includes a second aperture through which the electrical lead passes. In this version of the bracket, it is preferred that three first apertures pass through the first member, wherein each first aperture is dimensioned and configured to attach the housing to a mud flap weight. Again, this allows the lighted bracket to be securely (but reversibly) attached to the mud flap weight of a vehicle.

DETAILED DESCRIPTION

Figure 3:
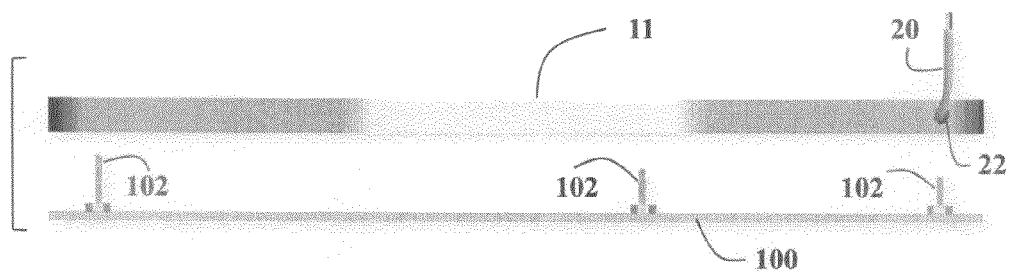
FIG. 3 is a top plan view, exploded, of the lighted bracket depicted in FIG. 2, juxtaposed with a mud flap weight 100.
Figure 2:
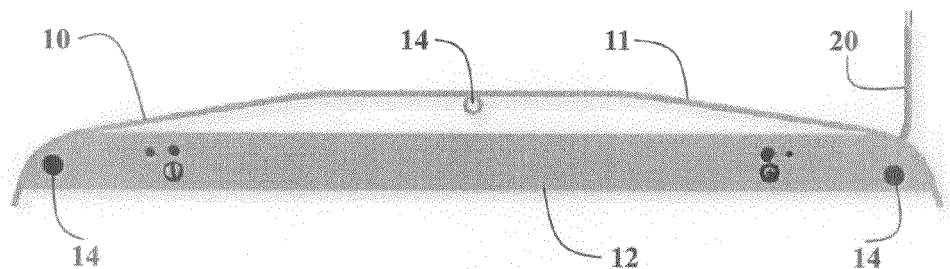
FIG. 2 is a rear elevation view of the lighted bracket depicted in FIG. 1.
Figure 1:
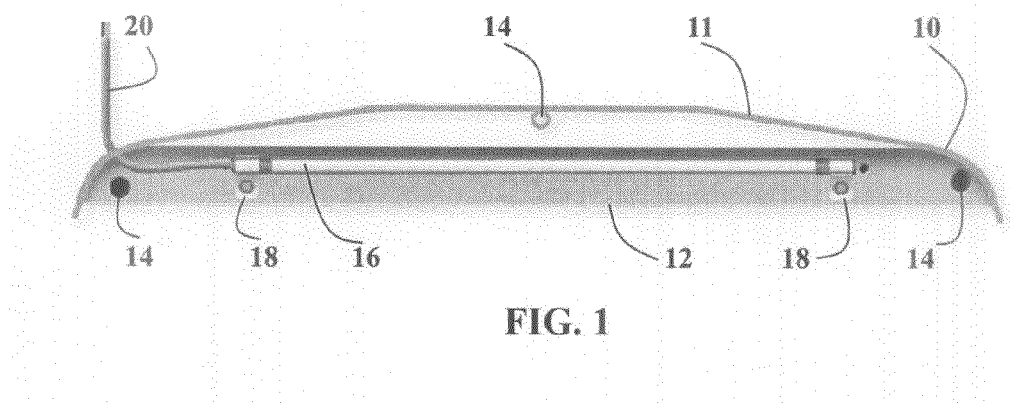
FIG. 1 is a front elevation view of a version of the lighted bracket.

Referring now to all of FIGS. 1, 2, and 3, in which identical reference numerals have been used in all three figures, shown is a lighted bracket having housing 10 dimensioned and configured for mounting to a mud flap weight 100 (shown in FIG. 3). The housing may comprise two members: a first member 11, which corresponds in shape to the perimeter of a mud flap weight. and a second member 12. The first member has at least one first aperture 14 passing therethrough. As shown in the figures, there are three such apertures 14. These apertures are dimensioned and configured to reversibly mount the housing 10 to a mud flap weight 100 via fasteners 102. The fasteners 102 are depicted in FIG. 3 as nuts and bolts, but any suitable reversible fastener will work (e.g., hook and loop-type closures, mollies, friction-type fittings and the like).

A light 16 is affixed to the housing 10 via mounts 18. See FIG. 1. The light source can be of any design now known or developed in the future, including (without limitation) incandescent light sources, fluorescent light sources and light-emitting diodes (LED). An LED light is preferred. The light-emitting element of the LED may be fabricated from any suitable inorganic, organic, or polymeric material. Thus, as used herein, the term "LED" explicitly encompasses LEDs of any and all design, including, without limitation organic LEDs (OLEDs), polymeric LEDs (PLEDs) and the like. The term "LED" also encompasses LEDs of any and all configurations or design, including those now known and those developed in the future, including (but not limited to), bottom- and/or top-emission LEDs, transparent LEDs, graded heterojunction LEDs, stacked LEDs, inverted LEDs, and patterned LEDs.

The light is preferably energized by the electrical system of the vehicle to which it is attached (not shown). The light could also be powered by a separate battery system or its own dedicated battery system or any other suitable power source (not shown). An electrical lead 20 is provided to operationally connect the light 16 to a suitable power source. The lead 20 preferably passes through aperture 22 in the first member 11, as shown in FIG. 3.

In this fashion, when the lighted bracket is affixed to a mud flap weight 100, it forms a type of shadow box in which illumination from the light 16 will pass through any holes, windows, or cut-outs in the mud flap weight 100.

Fabrication of the first member 11 of the 10 can be accomplished using any existing mud flap weight 100 as a guide or outline. An existing mud flap weight 100 is used as an outline to bend, mold, grind, forge, pound, or otherwise shape the first element 11 to correspond with shape of the perimeter of the mud flap weight 100 and also to position placement of the first apertures 14 so that they will mate with the bolts 102 on the mud flap weight. The first member 11 for the lighted bracket is preferably between 6" to 30" long×¾" wide and ⅛" to ¼" thick, and fabricated from metal or suitable durable polymeric material.

Similarly, the second element 12 is also typically and preferably between about 4" to 30" long×1½" wide×⅛" or ¼" thick, and fabricated from metal or suitable durable polymeric material. The first member 11 and second member 12 are connected to one another by any means now known or developed in the future. Welding or fusing is preferred.

The housing 10 is then attached to the mud flap weight 100 via fasteners 102, and the electrical lead 20 is attached to a suitable power supply. The result is a lighted mud flap weight in which illumination from the light 16 passes through any apertures, windows, or openings in the mud flap weight 100.

What is claimed is:

1. A lighted bracket for a mud flap weight, the bracket comprising:
    a housing comprising a first member corresponding in shape to a perimeter of a mud flap weight and having at least one first aperture passing through the first member, wherein the aperture is dimensioned and configured to reversibly attach the housing to a mud flap weight, and a second member attached to the first member;
    a light comprising an organic light-emitting diode (OLED) attached to the second member at a point where illumination from the light shines through any openings in a mud flap weight when the housing is attached to the mud flap weight via the first aperture; and
    an electrical lead attached to the light and configured to operationally connect the light to an electrical system of a vehicle, and wherein the housing further includes a second aperture through which the electrical lead passes.

2. The lighted bracket of claim 1, comprising three first apertures passing therethrough, wherein each first aperture is dimensioned and configured to attach the housing to a mud flap weight.

\* \* \* \* \*